(12) United States Patent
Takahashi et al.

(10) Patent No.: US 8,767,061 B2
(45) Date of Patent: Jul. 1, 2014

(54) INATTENTION DETERMINING APPARATUS

(75) Inventors: Akio Takahashi, Shioya-gun (JP);
Shinsuke Ueda, Utsunomiya (JP);
Seiichi Yamamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 13/170,504

(22) Filed: Jun. 28, 2011

(65) Prior Publication Data

US 2012/0002027 A1 Jan. 5, 2012

(30) Foreign Application Priority Data

Jul. 1, 2010 (JP) ................................. 2010-151045

(51) Int. Cl.
*H04N 7/18* (2006.01)
*H04N 5/228* (2006.01)

(52) U.S. Cl.
USPC ............... 348/77; 348/78; 348/143; 348/155; 348/222.1; 382/107

(58) Field of Classification Search
CPC ........... H04N 5/228; H04N 7/18; G06K 9/00; A61B 5/00; A61B 1/041
See application file for complete search history.

(56) References Cited

U.S. PATENT DOCUMENTS

2009/0273687 A1 * 11/2009 Tsukizawa et al. ......... 348/222.1
2011/0270123 A1 * 11/2011 Reiner ........................ 600/558

FOREIGN PATENT DOCUMENTS

| EP | 1968006 | 9/2008 |
|---|---|---|
| JP | 06-251272 | 9/1994 |
| JP | 2006-043429 | 2/2006 |
| JP | 2007-072632 | 3/2007 |
| JP | 2009-118989 | 6/2009 |
| JP | 2010-039686 | 2/2010 |

OTHER PUBLICATIONS

JP Notice of Allowance—Application No. 2010-151045 dated Jun. 5, 2012, six pages.

* cited by examiner

*Primary Examiner* — Joseph Ustaris
*Assistant Examiner* — Maryam Nasri
(74) *Attorney, Agent, or Firm* — Rankin, Hill & Clark LLP (57) ABSTRACT

An inattention determination device includes a sight direction detecting unit that detects a sight direction of a driver, and an inattention determining unit that measures an inattention continuation time from a time point when the sight direction is a predetermined inattention direction to a time point when the sight direction deviates from the predetermined inattention direction and becomes a direction other than the inattention direction and determines that the driver is inattentive when the intention continuation time is equal to or more than a predetermined time. The inattention determining unit maintains measurement of the inattention continuation time when the sight direction is changed at a speed higher than a predetermined movement speed from the predetermined inattention direction to a direction other than the inattention direction or when the sight direction is momentarily a direction other than the inattention direction.

5 Claims, 7 Drawing Sheets

INATTENTION DETERMINING APPARATUS

TECHNICAL FIELD

The present invention relates to an inattention determining apparatus. Priority is claimed on Japanese Patent Application No. 2010-151045, filed on Jul. 1, 2010, the contents of which are incorporated herein by reference in its entirety.

BACKGROUND ART

In the related art, an apparatus is known, which determines whether or not a driver is inattentive on the basis of a continuation time when a gazing point of the driver is at a position in a specific direction, such as inside or outside a vehicle, for example, by capturing an image of a driver's eyes using a camera and an infrared irradiator provided in the vehicle (see Japanese Patent Publication No. 3,369,237).

SUMMARY

In the apparatus of the related art, in a case of capturing an image of a bright point based on reflection of the infrared light to detect a sight direction, a wrong direction may be detected when the driver momentarily looks in the wrong direction due to erroneous detection of the bright point position. When the driver gazes at the inattention determination area and the erroneous detection in the sight direction occurs, unfortunately, the continuation time of the inattention state is reset by determining that the sight direction is momentarily toward a non-inattention determination area although the driver gazes at the inattention determination area. For this reason, there is a problem that the inattention of the driver is not appropriately determined, and a timing of performing an alarm operation depending on the continuation time is delayed.

An object of the aspects according to the present invention is to provide an inattention determining apparatus capable of appropriately determining the inattention of a driver.

(1) An inattention determination apparatus according to an aspect of the present invention includes: an image capturing device that captures a face image of a driver who occupies a driver's seat and outputting the face image; a sight direction detecting device that detects a sight direction of the driver from the face image output from the image capturing device and outputting the detection result; and an inattention determining device that measures a continuation time from a time point when the sight direction of the detection result output from the sight direction detecting device is a predetermined inattention direction to a time point when the sight direction deviates from the predetermined inattention direction and becomes a direction other than the inattention direction, and determining that the driver is inattentive when the continuation time is equal to or more than a predetermined time, wherein the inattention determining device maintains measurement of the continuation time when the sight direction of the detection result output from the sight direction detecting device is changed at a speed higher than a predetermined movement speed from the predetermined inattention direction to a direction other than the inattention direction or when the sight direction is momentarily a direction other than the inattention direction.

(2) In the aspect as described above (1), the predetermined movement speed may be a speed corresponding to a movement limit angle per unit time based on a saccade.

(3) The aspect as described above (1) may further includes a face direction detecting device that detects a face direction of the driver from the face image output from the image capturing device and outputting the detection result, wherein the inattention determining device maintains measurement of the continuation time when an angle between the sight direction of the detection result output from the sight direction detecting device and the face direction of the detection result output from the face direction detecting device is equal to or more than a predetermined angle.

As described above, according to the aspect as (1) described above, when the continuation time when the sight direction is the inattention direction (i.e., the direction to the predetermined inattention area) is measured, for example, when the sight direction is excessively changed by the erroneous detection of the sight direction detecting device, the measuring of the continuation time is maintained disregarding the erroneous detection. Accordingly, the measuring of the continuation time is prevented from being unnecessarily discontinued and reset, and it is possible to appropriately determine the inattention of the driver.

According to the aspect as (2) described above, when the sight direction is changed at the speed higher than the speed (i.e., the predetermined movement speed) corresponding to the movement limit angle per unit time based on a saccade (impulse eyeball movement), it is possible to easily determine that the erroneous detection of the sight direction detecting device occurs. Accordingly, it is possible to determine whether or not there is erroneous detection with high precision, and it is possible to improve the reliability in the operation.

According to the aspect as (3) described above, when the angle between the sight direction and the face direction is equal to or more than the predetermined angle, it is possible to determine that the erroneous detection of the sight direction detecting device occurs. Accordingly, it is possible to improve precision in determination of whether or not there is an erroneous detection, and it is possible to further improve the reliability in the operation.

DESCRIPTION

Hereinafter, an inattention determining apparatus according to an embodiment of the invention will be described with reference to the accompanying drawings.

Figure 1:
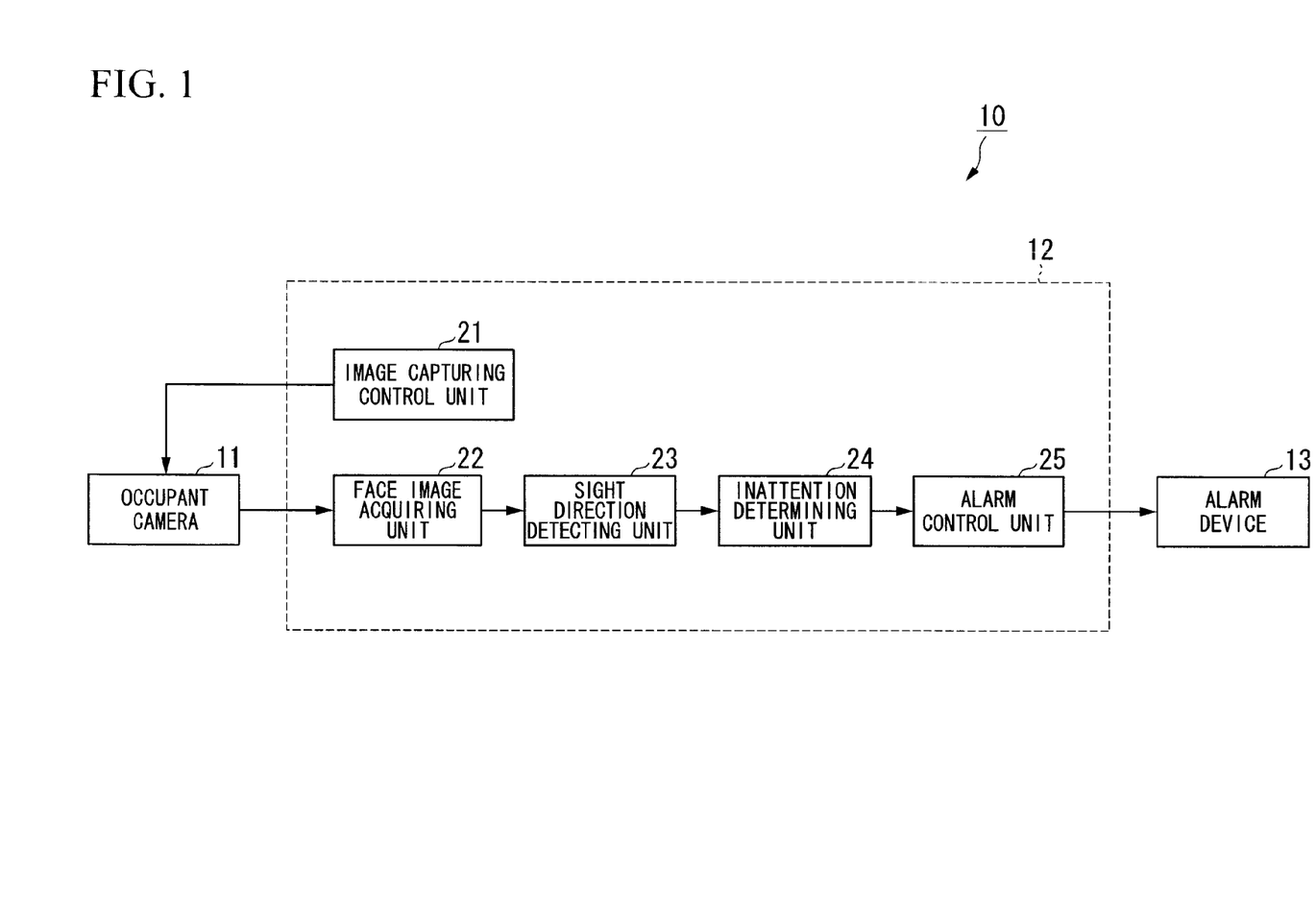
FIG. 1 is a diagram illustrating a configuration of an inattention determining apparatus according to an embodiment of the invention.

As shown in FIG. 1, an inattention determining apparatus 10 according to the embodiment is provided with, for example, an occupant camera 11, a process apparatus 12, and an alarm device 13.

The occupant camera 11 is provided, for example, on an instrument panel (not shown) in a vehicle, at least a face of a driver occupying a driver's seat of the vehicle is included as an image capturing target in an image capturing area. The occupant camera 11 can capture an image, for example, in a visible light area or an infrared ray area, and outputs the face image including the driver's face.

An image capturing light source capable of irradiating an image capturing target (e.g., the face of the driver occupying the driver's seat) with light such as visible light and infrared rays at the time of capturing an image with the occupant camera 11 may be provided, for example, at a position deviating from the occupant camera 11 left and right with respect to the instrument panel in the vehicle.

The process apparatus 12 is provided with, for example, an image capturing control unit 21, a face image acquiring unit 22, a sight direction detecting unit 23, an inattention determining unit 24, and an alarm control unit 25.

The image capturing control unit 21 controls image capturing performed by the occupant camera 11.

The face image acquiring unit 22 acquires the face image output from the occupant camera 11.

The sight direction detecting unit 23 performs a recognition process such as characteristic amount calculation and shape determination in which the driver's left and right eyeballs from the face image acquired by the face image acquiring unit 22 are a detection target, and detects the sight direction of the driver by a predetermined sight detecting process using, for example, a center position of an iris of the eye, a center position of a Purkinje image that is a reflection image of the infrared rays on the cornea surface, and a center position of the eyeball, on the basis of the process result.

The inattention determining unit 24 measures a continuation time (an inattention continuation time) from a time point when the sight direction of the driver detected by the sight direction detecting unit 23 is a predetermined inattention direction to a time point when the sight direction deviates from the predetermined inattention direction to be a direction other than the inattention direction. The predetermined inattention direction is, for example, a direction from the position of the driver's left and right eyes to a predetermined inattention area.

When the measured inattention continuation time is equal to or more than a predetermined alarm threshold time (e.g., 2 seconds, etc.), the inattention determining unit 24 determines that the driver is inattentive, and outputs a signal of the determination result.

After the sight direction of the user detected by the sight direction detecting unit 23 becomes a predetermined attention direction, the inattention determining unit 24 determines that the sight direction is erroneously detected, and maintains measurement of the inattention continuation time when the sight direction is changed from the predetermined inattention direction to a direction other than the inattention direction at a movement speed higher than the predetermined movement speed or when the sight direction is momentarily a direction other than the inattention direction. The predetermined movement speed is a speed corresponding to a movement limit angle D per unit time (e.g., D=600 deg/second, etc.) based on, for example, a saccade (impulse eyeball movement).

For example, when the detection result of the sight direction updated per unit time by a predetermined sight detecting process repeatedly performed at a predetermined process cycle by the sight direction detecting unit 23 is a frame rate F (e.g., F=30 frames/second, etc.), it is possible to calculate a threshold angle A per frame (e.g., A=D/F=600/30=20 deg/frame, etc.) corresponding to the movement limit angle D per unit time based on a saccade. The inattention determining unit 24 determines whether or not the change in angle of the sight direction for each frame is larger than the threshold angle A, to determine whether or not the sight direction detected by the sight direction detecting unit 23 is an erroneous detection.

Figure 2:
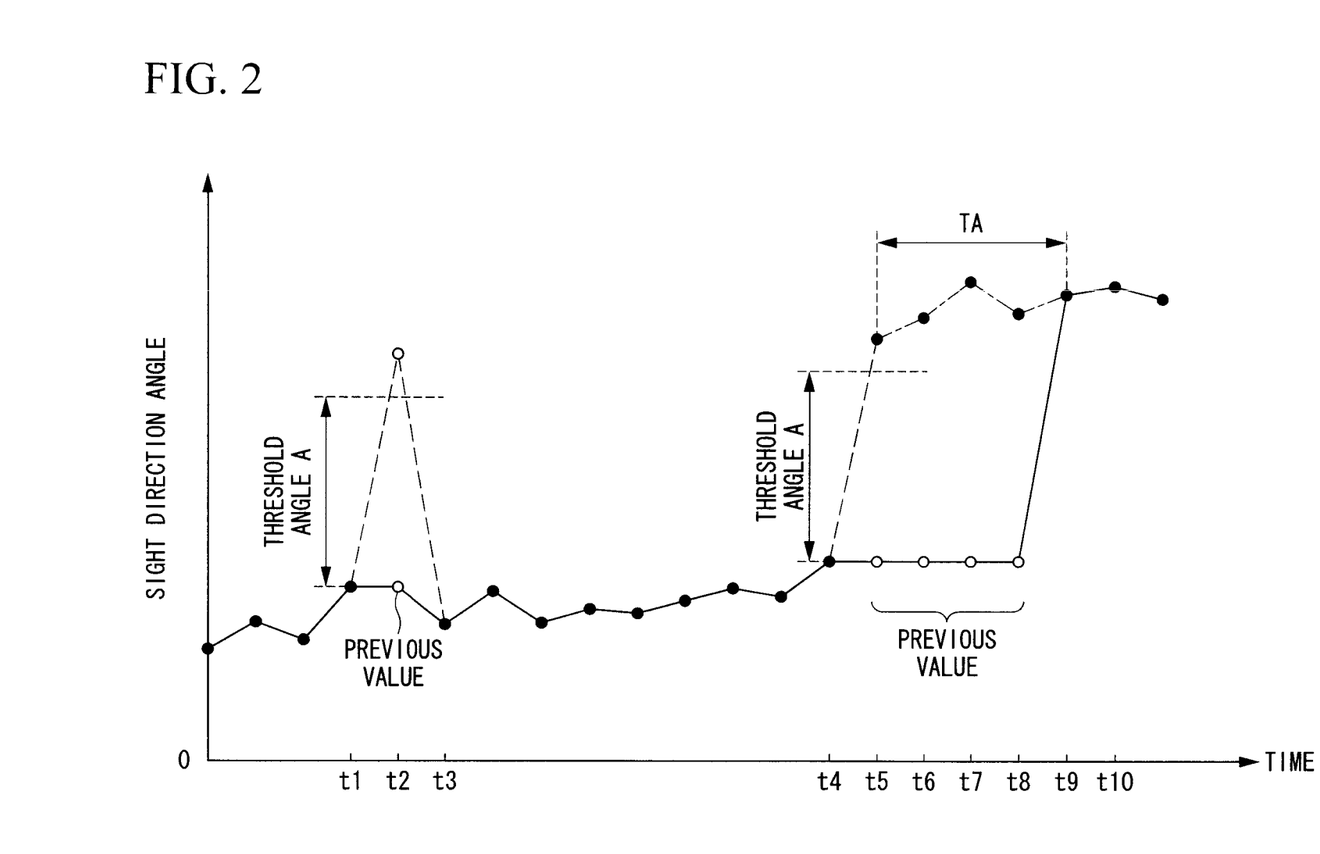
FIG. 2 is a diagram illustrating an example of change in time of a sight direction angle depending on a detection result of a sight direction detecting unit of the inattention determining apparatus of the embodiment.

For example, as shown in FIG. 2, as for the change in time of the angle (e.g., the sight direction angle) between the sight direction detected by the sight direction detecting unit 23 and a predetermined reference direction (e.g., the front direction of the driver, etc.), when the change of the sight direction angle (change between the previous frame (time) and the current frame (time)) is equal to or smaller than the threshold angle A, the inattention determining unit 24 employs the detection result of the sight direction detecting unit 23 for each frame as the sight direction of each frame.

Meanwhile, for example, when the change of the sight direction angle is momentarily larger than the threshold angle A as shown at the time t2, the inattention determining unit 24 determines that the detection result of the sight direction detecting unit 23 at the time t2 is the erroneous detection. The inattention determining unit 24 employs the previous value (i.e., the sight direction employed at the time t1) of the sight direction as the current value (i.e., the sight direction at the time t2), instead of the detection result of the sight direction detecting unit 23 at the time t2.

For example, as shown at the times t5 to t9, when the state where the change of the sight direction angle is larger than the threshold angle A is not temporary but a predetermined period TA (e.g., a period corresponding to a predetermined number of frames such as 5 frames or the like when the frame rate F is 30 frames/second), the inattention determining unit 24 employs the detection result of the sight direction detection unit 23 after the predetermined period TA, as the current value of the sight direction.

The predetermined period TA is, for example, the minimum time (e.g., 0.2 seconds, etc.) necessary for a person to recognize a target object. Accordingly, when the period when the sight direction is maintained at a proper target object is shorter than the predetermined period TA, it is considered that the person cannot recognize the target object and it is determined that erroneous detection of the sight direction has occurred.

That is, in the detection result of the sight direction detecting unit 23 at the time t5, since the change of the sight direction angle (the change of the sight direction employed at the time t4) is larger than the threshold value A, the inattention determining unit 24 employs the previous value (i.e., the sight direction employed at the time t4) of the sight direction as the current value (i.e., the sight direction at the time t5).

Further, in the detection result of the sight direction detecting unit 23 at the time t6, since the change of the sight direction angle (i.e., the change of the sight direction employed at the time t5) is larger than the threshold angle A, the inattention determining unit 24 employs the previous value (i.e., the sight direction employed at the time t5) of the sight direction as the current value (i.e., the sight direction at the time t6).

In the same manner, also in the detection result of the sight direction detecting unit 23 sequentially at the times t7 and t8, since the change of the sight direction angle is larger than the threshold angle A, the inattention determining unit 24 employs the previous value (i.e., sequentially the sight directions employed at the time t6 and t7) of the sight direction as the current value (i.e., the sight directions at the times t7 and t8).

In the detection result of the sight direction detecting unit 23 at the time t9, the change of the sight direction angle (i.e., the change of the sight direction employed at the time t8) is larger than the threshold angle A. However, in this case, since the continuation time of the state where the change of the sight direction angle is larger than the threshold angle A reaches the predetermined period TA (e.g., a period corresponding to a predetermined number of frames such as 5 frames when the frame rate F is 30 frames/second), the inattention determining unit 24 employs the detection result of the sight direction detecting unit 23 as the current value (i.e., the sight direction at the time t9) of the sight direction.

Figure 3:
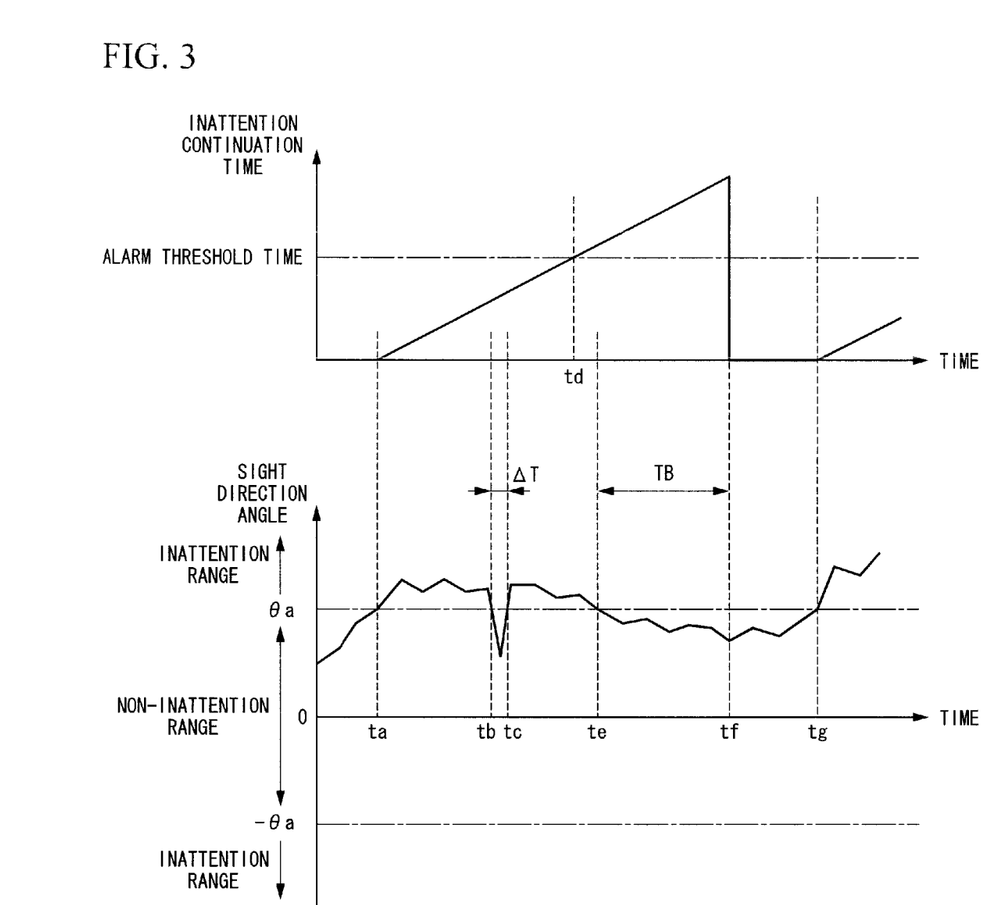
FIG. 3 is a diagram illustrating an example of correspondence relation between the change in time of the sight direction angle depending on the detection result of the sight direction detecting unit and an inattention continuation time of the inattention determining apparatus of the embodiment.

For example, as shown in FIG. 3, after the time to when an absolute value of the sight direction angle is equal to or more than a predetermined threshold value θa, the inattention determining unit 24 starts measuring the inattention continuation time and continues the measuring even when the absolute value of the sight direction angle is momentarily changed (i.e., for a short time ΔT shorter than the minimum time necessary for a person to recognize a target object) or changed at a speed higher than a predetermined movement speed at an angle smaller than the predetermined threshold angle θa, for example, between the times tb and tc.

For example, after the time td when the inattention continuation time is equal to or longer than a predetermined alarm threshold time (e.g., 2 seconds, etc.), the inattention determining unit 24 determines that the driver is inattentive, and outputs a signal of the determination result to the alarm control unit 25 to perform a predetermined alarm operation by the alarm device 13.

As shown at the times to tf, when the continuation time when the absolute value of the sight direction angle is less than the predetermined threshold angle θa reaches a predetermined period TB (e.g., a period corresponding to a predetermined number of frames such as 5 frames when the frame rate F is 30 frames/second) or more, the inattention determining unit 24 initializes the inattention continuation time to zero.

The predetermined time TB is, for example, the minimum time (e.g., 0.2 seconds, etc.) necessary for a person to recognize a target object. Accordingly, when the period when the sight direction is maintained at the proper target object is shorter than the predetermined period TB, it is considered that the person cannot recognize the target object and it is determined that the erroneous detection of the sight direction occurs.

For example, as shown after the time tg, when the absolute value of the sight direction is equal to or larger than the predetermined threshold value θa, the inattention determining unit 24 starts measuring the inattention continuation time again.

After the sight direction of the driver becomes a predetermined inattention direction, for example, when the sight direction cannot be momentarily detected due to blinking of the driver, the inattention determining unit 24 maintains measurement of the inattention continuation time.

Even when the sight direction of the driver is not the predetermined inattention direction, and when the sight direction cannot be detected, for example, when the driver blinks or when the face or the sight of the driver is out of the image capturing range of the occupant camera 11 or out of the detection range of the sight direction detecting unit 23, the inattention determining unit 24 starts measuring the inattention continuation time.

When the inattention determining unit 24 determines that the driver is inattentive, the alarm control unit 25 controls the alarm device 13 to perform a predetermined alarm operation.

The alarm device 13 is provided with, for example, a haptical alarm device, a visual alarm device, and an auditory alarm device.

The haptical alarm device is, for example, a seat belt apparatus, a steering control apparatus, or the like. The haptical alarm device, for example, generates a predetermined tension in the seat belt to act as a tightening force which can be haptically recognizable by an occupant in the vehicle, or, for example, generates vibration (steering vibration) which can be haptically recognizable by the driver, to a steering wheel, according to a control signal output from the alarm control unit 25.

The visual alarm device is, for example, a display apparatus or the like. The visual alarm device, for example, displays predetermined information on a display apparatus, or flashes a predetermined lighting body, according to a control signal input from the alarm control unit 25.

The auditory alarm device is, for example, a speaker or the like. The auditory alarm device, for example, outputs a predetermined sound, voice, or the like according to a control signal input from the alarm control unit 25.

The inattention determining apparatus 10 according to the embodiment is provided with the configuration described above. Next, an operation of the inattention determining apparatus 10 will be described.

Figure 4:
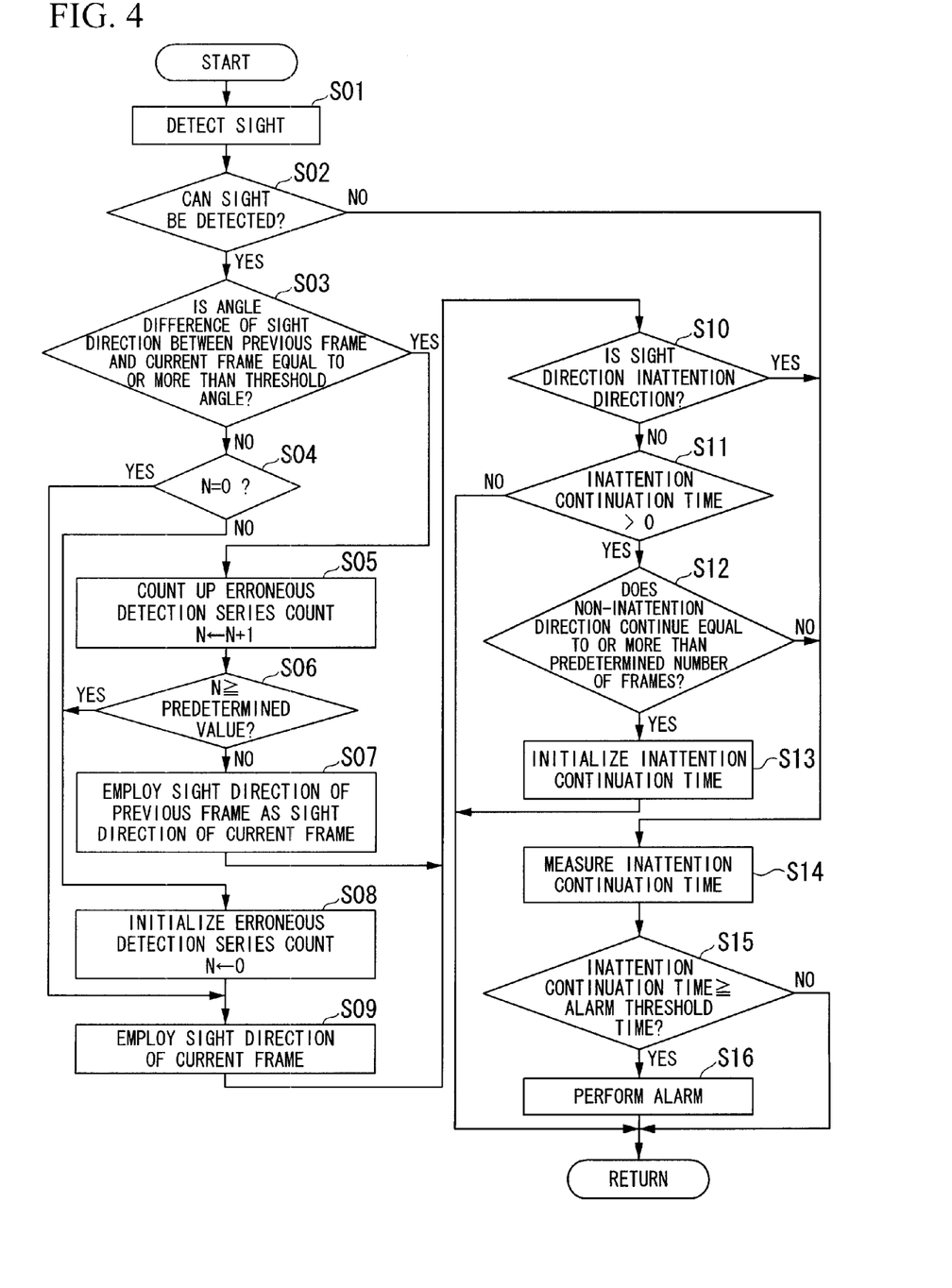
FIG. 4 is a flowchart illustrating an operation of the inattention determining apparatus of the embodiment.

First, for example, in Step S01 shown in FIG. 4, a process of detecting the sight direction of the driver is performed on the basis of the face image output from the occupant camera 11.

Then, in Step S02, it is determined whether or not the sight direction of the driver can be detected.

When the determination result is "No", the process proceeds to Step S14 to be described later.

Meanwhile, when the determination result is "Yes", the process proceeds to Step S03.

Then, in Step S03, it is determined whether or not the angle difference in the sight direction angle between the previous frame and the current frame is equal to or larger than the threshold angle A.

When the determination result is "Yes", the process proceeds to Step S05. Meanwhile, when the determination result is "No", the process proceeds to Step S04.

In Step S04, it is determined whether or not an erroneous detection series count N is zero.

When the determination result is "No", the process proceeds to Step S08 to be described later.

Meanwhile, when the determination result is "Yes", the process proceeds to Step S09 to be described later.

In Step S05, the erroneous detection series count N counts up by "1".

Then, in Step S06, it is determined whether or not the erroneous detection series count N is equal to or more than a predetermined value (i.e., a value corresponding to the predetermined period TA, e.g., 5 counts corresponding to 5 frames when the frame rate F is 30 frames/second, etc.).

When the determination result is "Yes", the process proceeds to Step S08 to be described later.

Meanwhile, when the determination result is "No", the process proceeds to Step S07.

In Step S07, it is determined that the current detection result of the sight direction detecting unit 23 is the erroneous detection, the previous value of the sight direction (i.e., the sight direction employed at the previous frame) is employed as the current value (i.e., the sight direction at the current frame), and the process proceeds to Step S10 to be described later.

In Step S08, the erroneous detection series count N is initialized to zero.

In Step S09, the current detection result of the sight direction detecting unit 23 is employed as the current value of the sight direction (i.e., the sight direction at the current frame).

In Step S10, it is determined whether or not the sight direction is the inattention direction.

When the determination result is "No", the process proceeds to Step S11.

Meanwhile, when the determination result is "Yes", the process proceeds to Step S14 to be described later.

In Step S11, it is determined whether or not the inattention continuation time is larger than zero.

When the determination result is "Yes", the process proceeds to Step S12.

Meanwhile, when the determination result is "No", the process proceeds to RETURN.

In Step S12, it is determined whether or not the state where the sight direction is the non-inattention direction continues equal to or more than a predetermined number of frames (i.e., a value corresponding to the predetermined period TB, e.g., 5 frames when the frame rate F is 30 frames/second, etc.).

When the determination result is "No", the process proceeds to Step S14 to be described later.

Meanwhile, when the determination result is "Yes", the process proceeds to Step S13.

In Step S13, the inattention continuation time is initialized to zero, the process proceeds to RETURN.

In Step S14, the measuring of the inattention continuation time starts or continues.

In Step S15, it is determined whether or not the inattention continuation time is equal to or longer than a predetermined alarm threshold value (e.g., 2 seconds, etc.).

When the determination result is "No", the process proceeds to RETURN.

Meanwhile, when the determination result is "Yes", the process proceeds to Step S16.

In Step S16, a predetermined alarm according to the inattention of the driver is performed, and the process proceeds to RETURN.

As described above, according to the inattention determining apparatus 10 of the embodiment, when measuring the inattention continuation time when the sight direction is the inattention direction (i.e., a direction to a predetermined inattention area), for example, when the sight direction is excessively changed due to the erroneous detection of the sight direction detecting unit 23, the measuring of the inattention continuation time is maintained in disregard of the erroneous detection. Accordingly, the measuring of the inattention continuation time is prevented from being unnecessarily discontinued and reset, it is possible to appropriately determine the inattention of the driver, and it is possible to prevent the execution timing of the alarm operation according to the inattention continuation time from being delayed.

When the sight direction is changed at the speed higher than the speed (i.e., the predetermined movement speed) corresponding to the movement limit angle D per unit time based on a saccade (impulse eyeball movement) or when the sight direction is momentarily changed, it is possible to easily determine that the erroneous detection of the sight direction detecting unit 23 occurs. Accordingly, it is possible to determine whether or not there is erroneous detection with high precision, and it is possible to improve reliability in the alarm operation.

Figure 5:
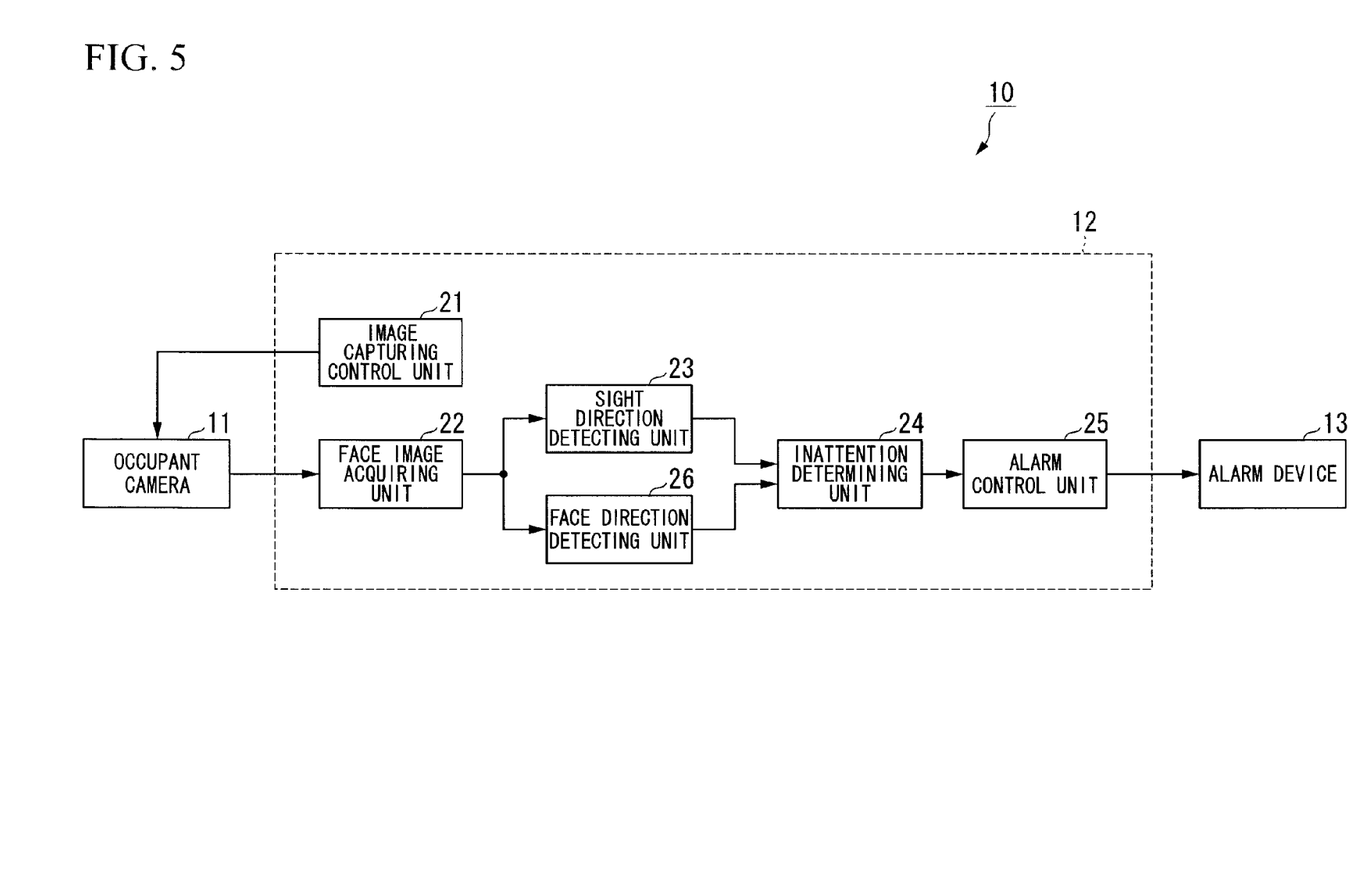
FIG. 5 is a diagram illustrating a configuration of an inattention determining apparatus in a modified example of the embodiment.

In the embodiment described above, the inattention determining apparatus 10 may be provided with, for example, the face direction detecting unit 26 shown in the modified example shown in FIG. 5.

Figure 6:
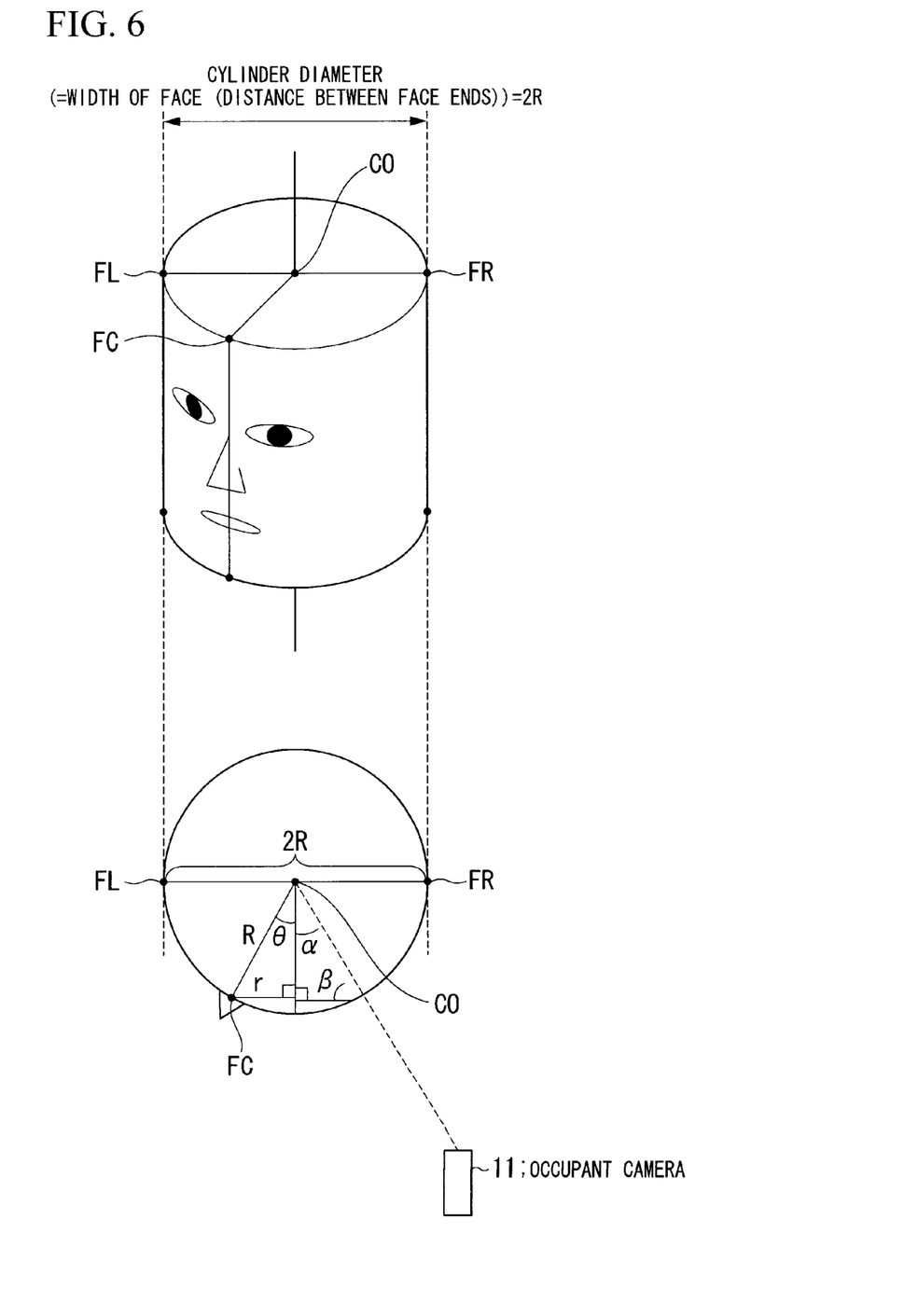
FIG. 6 is a diagram illustrating an example of an angle θ formed by a face direction detected by a face direction detecting unit of the inattention determining apparatus in the modified example.

For example, as shown in FIG. 6, the face direction detecting unit 26 detects the face direction of the driver by a cylinder method of approximating a person's face to a cylindrical shape to calculate the face direction.

Specifically, first, the face direction detecting unit 26 performs a recognition process such as characteristic amount calculation and shape determination in which the driver's left and right eyeballs from the face image acquired by the face image acquiring unit 22 are a detection target, and calculates the center between the left and right eye positions of the driver, such that the calculated result is a face center position FC.

The face direction detecting unit 26 sets a plurality of search lines crossing the face of the driver on the face image acquired by the face image acquiring unit 22, for example, in an area other than a predetermined vertical direction position (e.g., a position where a change in brightness in the left and right directions is likely to be equal to or more than a predetermined change, due to the presence of eyes or the like) such as in a predetermined range including, for example, the face center position FC. For example, the search lines are lines having a vertical width corresponding to one pixel for each pixel in the vertical direction of the face image and elongating in the left and right directions. The vertical width of each search line is not limited to the width corresponding to one pixel, and may be another vertical width.

The face direction detecting unit 26 detects left and right ends (left and right face end positions) FL and FR of the face for each of the plurality of search lines, except for search lines which do not satisfy a predetermined condition. The predetermined condition is that the face left end is present on the more left side than the face center position FC, the face right end is present on the more right side than the face center position FC, and a distance between the face left end and the face right end is within a predetermined range.

The face direction detecting unit 26 calculates an angle θ of the face direction with respect to the front direction of the driver for each of the plurality of search lines on the basis of the face center position FC and the left and right face end positions FL and FR. That is, it is assumed that a distance in the left and right directions between a center position CO between the left and right face end positions FL and FR and the face center position FC is a declination r of the face center, a distance between the left and right face end positions FL and FR is a face width 2R, and the face direction detecting unit 26 calculates the angle θ of the face direction with respect to the front direction of the driver occupying a driver's seat on the basis of an angle α of a direction from the center position CO to the occupant camera 11 with respect to the front direction of the driver occupying a driver's seat, the declination r of the face center, and the width 2R of the face. For example, with angle β=90−α, Formula (1) is modified as follows by the sine theorem to obtain Formula (2) as follows, and the angle θ is described as shown in Formula (3) as follows from Formula (2) as follows.

$$\frac{R}{\sin(\beta)} = \frac{r}{\sin(\theta + \alpha)} \quad (1)$$

$$\frac{r \cdot \sin(\beta)}{R} = \sin(\theta + \alpha) \quad (2)$$

-continued $$\theta = \sin^{-1}\left(\frac{r \cdot \sin(\beta)}{R}\right) - \alpha \quad (3)$$

Finally, the face direction detecting unit 26 detects the median value of the face directions as the face direction of the driver on the basis of the plurality of face directions.

Figure 7:
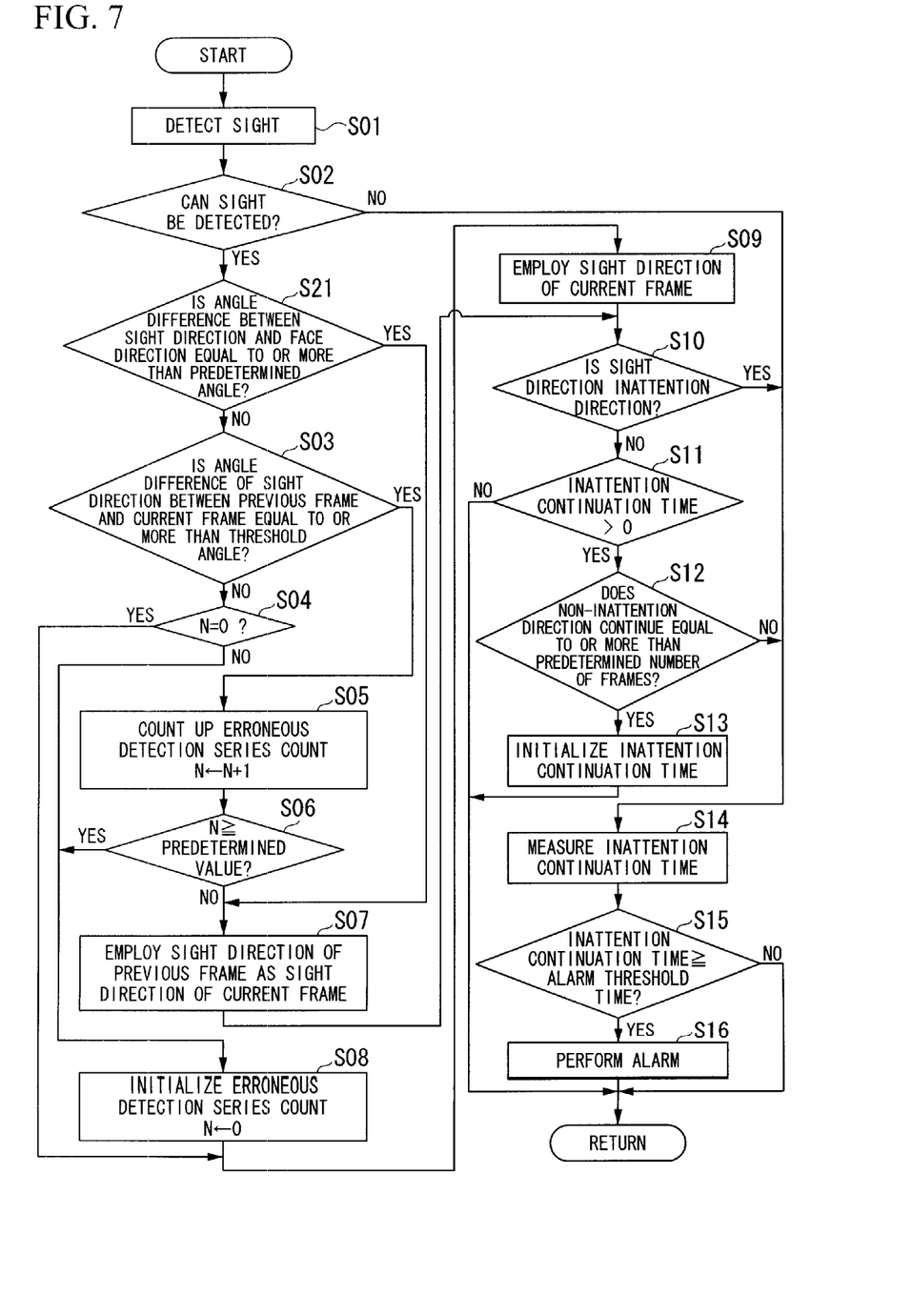
FIG. 7 is a flowchart illustrating an operation of the inattention determining apparatus in the modified example.

In the modified example, for example, as shown in FIG. 7, after performing the processes of Step S01 and Step S02 described in the embodiment, when the determination result of Step S02 is "No", the process proceeds to Step S14.

Meanwhile, when the determination result of Step S02 is "Yes", the process proceeds to Step S21.

In Step S21, the face direction of the driver is detected, and it is determined whether or not the angle difference between the sight direction and the face direction is equal to or more than a predetermined angle.

When the determination result is "Yes", it is determined that the sight direction is erroneously detected and the process proceeds to Step S07.

Meanwhile, when the determination result is "No", the process proceeds to Step S03.

Thereafter, the processes of Step S03 to Step S16 described in the embodiment are performed.

According to the modified example, precision in detection and reliability in a detection result of the face direction are higher than those of the sight direction.

Accordingly, it is possible to determine the erroneous detection of the sight direction with reference to the face direction, the measuring of the inattention continuation time is prevented from being unnecessarily discontinued or reset, and it is possible to appropriately determine the inattention of the driver.

While preferred embodiments of the invention have been described and illustrated above, it should be understood that these are exemplary of the invention and are not to be considered as limiting. Additions, omissions, substitutions, and other modifications can be made without departing from the r scope of the present invention. Accordingly, the invention is not to be considered as being limited by the foregoing description, and is only limited by the scope of the appended claims.

The invention claimed is:

1. An inattention determining apparatus comprising:
    an image capturing device that captures a face image of a driver who occupies a driver's seat and outputting the face image;
    a sight direction detecting device that detects a sight direction of the driver from the face image output from the image capturing device and outputting a detection result;
    an inattention determining device that measures a continuation time from a time point when the sight direction of the detection result output from the sight direction detecting device is a predetermined inattention direction to a time point when the sight direction deviates from the predetermined inattention direction and becomes a direction other than the inattention direction, and determining that the driver is inattentive when the continuation time is equal to or more than a predetermined time; and
    a face direction detecting device that detects a face direction of the driver from the face image output from the image capturing device and outputting a detection result,
    wherein, when an angle between the sight direction of the detection result output from the sight direction detecting device for each frame updated per unit time and the face direction of the detection result output from the face direction detecting device is less than a predetermined angle, the inattention determining device determines whether or not an angle difference between the sight direction in a previous frame and the sight direction in a current frame is larger than a predetermined threshold angle, and if the angle difference is larger than the predetermined threshold angle the inattention determining device employs a previous value of the sight direction as a current value, and
    wherein, when the angle between the sight direction of the detection result output from the sight direction detecting device for each frame updated per unit time and the face direction of the detection result output from the face direction detecting device is greater than or equal to the predetermined angle, the inattention determining device determines that the sight direction is erroneously detected and employs a previous value of the sight direction as a current value without determining whether or not the angle difference between the sight direction in the previous frame and the sight direction in the current frame is larger than the predetermined threshold angle.

2. The inattention determining apparatus according to claim 1, wherein the predetermined movement speed is a speed corresponding to a movement limit angle per unit time based on a saccade.

3. The inattention determining apparatus according to claim 1,
    wherein the sight direction detecting device detects the sight direction with a reflection image of an infrared ray from a cornea, and
    wherein the face direction detecting device detects an angle of the face direction with respect to a front direction of the driver based on a face center position and left and right face end positions.

4. The inattention determining apparatus according to claim 3, further comprising:
    an alarm device that performs a predetermined alarm operation when the inattention determining device determines that the driver is inattentive.

5. The inattention determining apparatus according to claim 1, further comprising:
    an alarm device that performs a predetermined alarm operation when the inattention determining device determines that the driver is inattentive.

* * * * *